US006804508B1

(12) United States Patent
Yamada

(10) Patent No.: US 6,804,508 B1
(45) Date of Patent: Oct. 12, 2004

(54) PORTABLE COMMUNICATION TERMINAL

(75) Inventor: Kazumori Yamada, Shizuoka (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/450,206

(22) Filed: Nov. 29, 1999

(30) Foreign Application Priority Data

Nov. 30, 1998 (JP) .......................................... 10-339414

(51) Int. Cl.[7] ................................................ H04Q 7/20

(52) U.S. Cl. ............................... 455/414.1; 455/412.1; 455/466

(58) Field of Search ................................ 455/550, 575, 455/412, 413, 412.1, 414.1, 466, 550.1, 459, 567, 560, 462, 10, 417; 379/263, 267, 260, 269, 82, 142, 88.24, 80

(56) References Cited

U.S. PATENT DOCUMENTS

| | | | | |
|---|---|---|---|---|
| 5,581,602 A | * 12/1996 | Szlam et al. | | 379/88.05 |
| 5,799,066 A | * 8/1998 | Joyce et al. | | 379/88.05 |
| 5,862,488 A | * 1/1999 | Kotzin et al. | | 455/510 |
| 5,991,367 A | * 11/1999 | Robuck | | 379/88.24 |
| 6,064,876 A | * 5/2000 | Ishida et al. | | 455/412 |
| 6,097,935 A | * 8/2000 | Takahashi et al. | | 455/186.1 |
| 6,148,213 A | * 11/2000 | Bertocci et al. | | 455/462 |
| 6,246,889 B1 | * 6/2001 | Boltz et al. | | 455/567 |
| 6,373,925 B1 | * 4/2002 | Guercio et al. | | 379/82 |
| 6,377,795 B1 | * 4/2002 | Bach et al. | | 455/417 |
| 6,466,782 B2 | * 10/2002 | Ishikawa et al. | | 455/412.2 |

FOREIGN PATENT DOCUMENTS

| | | |
|---|---|---|
| JP | 61-142851 | 6/1986 |
| JP | 01-167757 | 11/1989 |
| JP | 03-049451 | 3/1991 |
| JP | 03-066293 | 3/1991 |
| JP | 4-276966 | 10/1992 |
| JP | 4-368027 | 12/1992 |
| JP | 05-014552 | 1/1993 |
| JP | 7-87197 | 3/1995 |
| JP | 07-131546 | 5/1995 |
| JP | 09-275441 | 10/1997 |
| JP | 10-70602 | 3/1998 |
| JP | 10-145520 | 5/1998 |

* cited by examiner

*Primary Examiner*—Charles Appiah
*Assistant Examiner*—Joy K. Contee
(74) *Attorney, Agent, or Firm*—Scully, Scott, Murphy & Presser

(57) ABSTRACT

Portable communication terminal 101 of the present invention comprises time counting means 103 for counting a call duration on the basis of a state of connection with a called party, table 115 in which correspondence between the recognition code specifing at least one additional message and said called party is previously registered, selecting means 107 for previously holding a recognition code corresponding to an additional message to be transmitted to a called party and outputting the held recognition code on the basis of the counted call duration, and control means 109 for reading an additional message on the basis of the outputted recognition code, in order to automatically transmit an additional message to a called party in place of a calling party on the basis of a call duration.

5 Claims, 8 Drawing Sheets

Fig. 3

| No. | kinds of message | contents of message | recognition code | message setting mark |
|---|---|---|---|---|
| 1 | apology | "Sorry, touched a wrong number." | A | ○ |
| 2 | apology | "I am sorry." | B | |
| 3 | memo | "Ring up at 03-3162-5680" | — | |
| 4 | memo | "Call up firm XX at 13:00 hour" | — | |
| 5 | for answering machine | "This member is unattended. Please leave a message." | — | |
| ⋮ | ⋮ | ⋮ | ⋮ | |

Fig. 4

| No. | called party | subscriber's number | additional message | |
|---|---|---|---|---|
| | | | voice | display |
| 1 | (apology) | (subscriber) | A | A |
| 2 | Suzuki | 000-111-1111 | C | C |
| 3 | Sato | 000-222-2222 | D | — |
| 4 | Mochizuki | 000-333-3333 | — | — |
| ⋮ | ⋮ | ⋮ | ⋮ | |

PORTABLE COMMUNICATION TERMINAL

BACKGROUND OF THE INVENTION

1. Field of the Invention

The present invention relates to a communication terminal, and more particularly to a portable communication terminal for transmitting an additional message to a called party on the basis of a call duration.

2. Description of the Related Art

Service systems with portable communication terminals (PHS terminals, PDC terminals or the like) become prevalent in addition to those with conventional fixed telephones.

As a known technique relating to the portable communication terminal for transmitting an additional message to a called party on the basis of a call duration, JP-A-4-368027 discloses a technique pertaining to a portable telephone for use as a pager in accordance with surrounding conditions of a called party. JP-A-10-70602 discloses a technique pertaining to a communication terminal capable of automatically transmitting a reply message.

Additionally, JP-A-10-145520 discloses a technique pertaining to a communication terminal in which a calling party discriminates between information requiring an immediate reply and information requiring no immediacy such that a called party automatically discriminates the information requiring no immediacy.

An additionl message transmitted automatically from a calling party to a called party in portable communication system in place of a calling party on the basis of a call duration is ordinarily the same additional message as the one for a specified called party. As a result, there is a problem that the utilization of the portable communication system in place of a calling party is limited.

SUMMARY OF THE INVENTION

It is an object of the present invention to provide a portable communication terminal for automatically transmitting an additional message to a called party after the call in place of a calling party in addition to automatic transmission of an apology message.

Portable communication terminal 101 of the present invention comprises, referring to FIG. 1, transmit/receive means 103 including an antenna, time counting means 105 for counting a call duration on the basis of a state of connection with a called party, store means 111 having table 115 in which correspondence between said recognition code specifing at least one additional message and said called party is previously registered, selecting means 107 for previously holding the recognition code corresponding to the additional message to be transmitted and outputting the held recognition code on the basis of the counted call duration, and control means 109 for reading the additional message on the basis of the outputted recognition code.

The portable communication terminal 101 is characterized in that it further comprises manipulation means 113, wherein the end of a call in the call duration is determined in response to manipulation with the manipulation means 113, and the state of connection with the called party is disconnected after the additional message is transmitted.

The selecting means 107 includes means 107-1 for storing a preset call duration, means 107-2 for comparing the counted call duration with the preset call duration, means 107-3 for previously holding the recognition code corresponding to the additional message to be transmitted, and means 107-4 for outputting the held recognition code on the basis of the result of the comparison.

The additional message is characterized in that it is a preset voice apology message and a display message for each called party, and transmitted to the called party when the counted call duration is shorter than the preset call duration.

The additional message is characterized in that it is a preset voice message and a display message for each called party, and transmitted to the called party when the counted call duration is longer than the preset call duration.

A method of transmitting a message with portable communication terminal 101 according to the present invention comprises the steps of counting a call duration on the basis of a state of connection with a called party, previously holding a recognition code corresponding to an additional message to be transmitted, previously registering correspondence between said recognition code specifing at least one additional message and said called party on table 115, and outputting the held recognition code on the basis of the counted call duration, and reading the additional message on the basis of the outputted recognition code.

The method further comprises the step of determining the end of a call in the call duration and disconnecting the state of connection with the called party after the additional message is transmitted.

The step of outputting the recognition code includes the steps of storing a preset call duration, comparing the counted call duration with the preset call duration, previously holding the recognition code corresponding to the additional message to be transmitted to the called party, and selecting the held recognition code on the basis of the result of the comparison.

The portable communication terminal according to the present invention enables an additional message to be automatically transmitted to a called party in place of a calling party on the basis of a call duration.

BRIEF DESCRIPTION OF THE DRAWINGS

FIG. 3 is a diagram for explaining a table in which apology messages and recognition codes are registered;

FIG. 4 is a diagram for explaining a table in which additiona message, called party and recognition codes are registered;

DESCRIPTION OF THE PREFERRED EMBODIMENTS

A portable communication terminal of the present invention will be hereinafter described in detail in conjunction with embodiment thereof with reference to the accompanying drawings.

Figure 1:
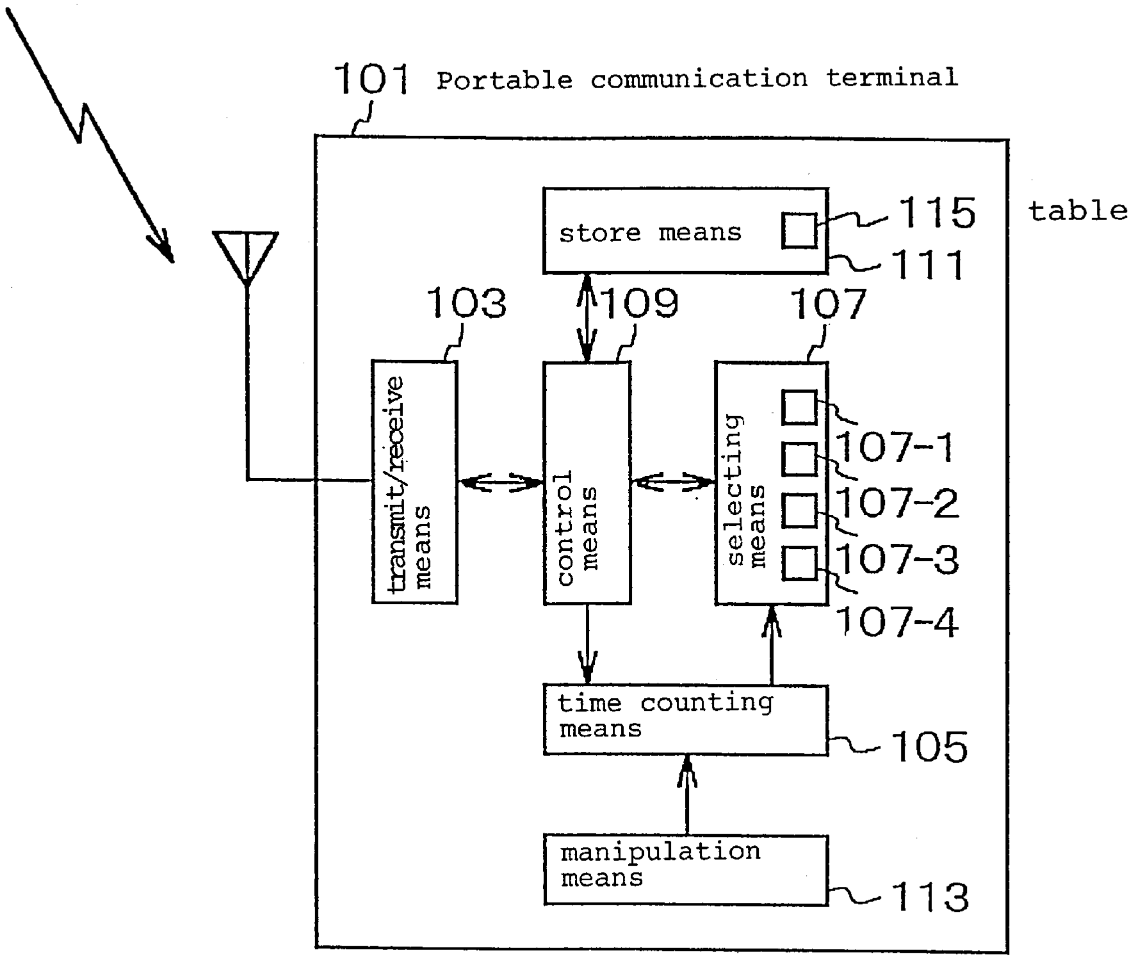
FIG. 1 is a functional block diagram of a portable communication terminal of the present invention.

FIG. 1 shows a functional block diagram of a portable communication terminal which represents the present invention. Portable communication terminal 101 comprises transmit/receive means 103, time counting means 105, selecting means 107, control means 109, store means 111 and manipulation means 113. Transmit/receive means 103 performs transmit/receive processing of radio signals or additional messages.

Time counting means 105 counts a call duration on the basis of a state of connection with a called party. Time counting means 105 starts a counting operation of a call duration in response to an instruction (not shown) from control means 109 when a telephone line is established with a called party. Additionally, counting means 105 recognizes call termination in response to external input manipulation through manipulation means 113 to stop the counting operation.

A call duration is determined in response to external manipulation through manipulation means 113. The telephone line with a called party is disconnected after an additional message is transmitted.

Store means 111 stores table 115 as shown in FIG. 3 and FIG. 4. Table 115 in FIG. 3 is a part of FIG. 4 and it has at least apology additional message corresponding to a recognition code registered therein. Table 115 in FIG. 4 has at least telephone number of the called party, and additional message corresponding to a recognition code registered.

Selecting means 107 previously holds a recognition code corresponding to an additional message to be transmitted to a called party. Selecting means 107 outputs the held recognition code on the basis of a counted call duration.

Selecting means 107 comprises means 107-1 for storing a preset call duration, means 107-2 for comparing a counted call duration with the preset call duration, means 107-3 for previously holding a recognition code corresponding to an additional message to be transmitted to a called party, and means 107-4 for outputting the held recognition code on the basis of the comparison result.

Control means 109 reads an additional message on the basis of the recognition code outputted from selecting means 107. Control means 109 refers to table 115 in response to the outputted recognition code. Control means 109 reads an additional message corresponding to the outputted recognition code.

Figure 2:
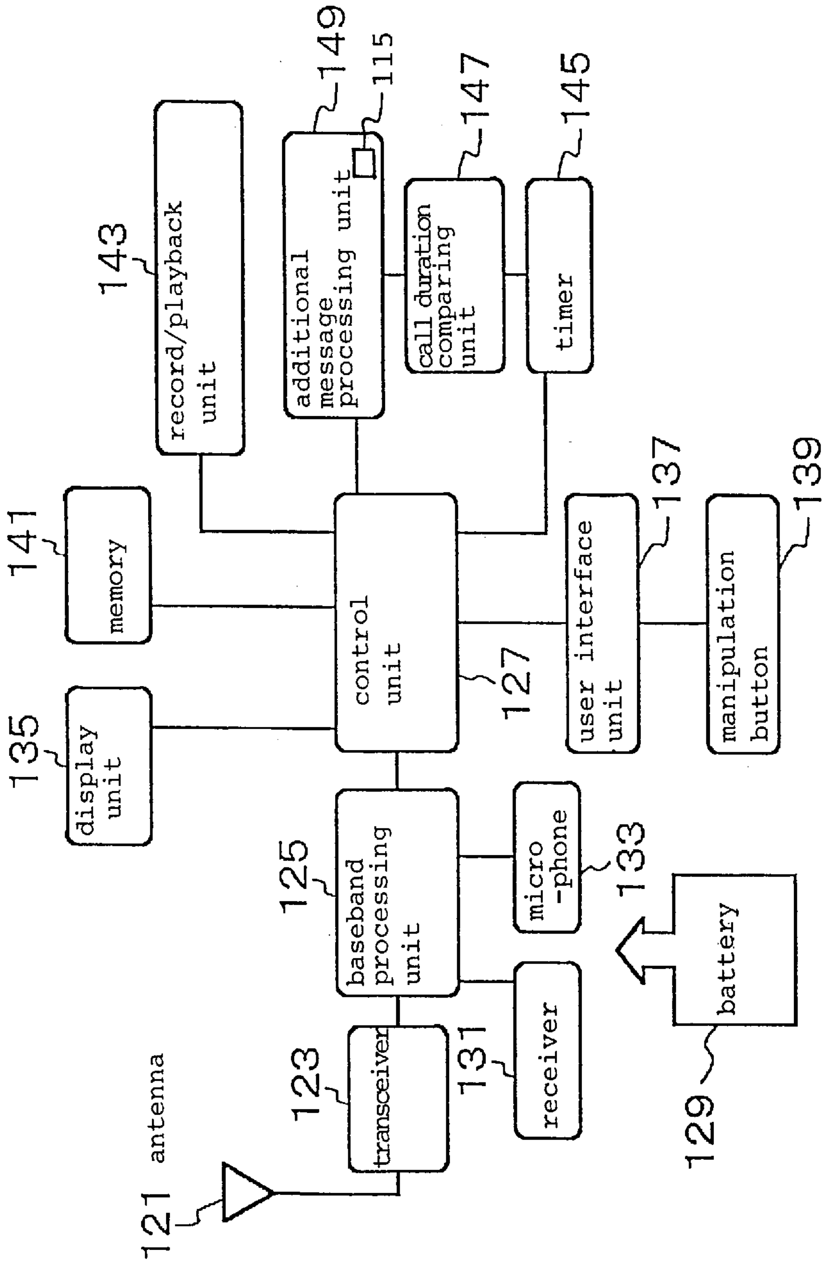
FIG. 2 is configuration block diagram of a portable communication terminal according to an embodiment of the present invention.

FIG. 2 shows a configuration block diagram of a portable communication terminal according to an embodiment of the present invention. While FIG. 2 uses a PHS (Personal Handy-Phone System) terminal as an example, a portable telephone terminal or a telephone in a fixed network may be used other than a PHS terminal and the present invention is not limited thereto.

The portable communication terminal comprises antenna 121, transceiver 123, baseband processing unit 125, control unit 127 (control means 109), battery 129, receiver 131, microphone 133 and display unit 135.

The portable communication terminal also comprises user interface unit 137, manipulation button 139, memory 141, voice record/playback unit 143 (store means 111), timer 145 (time counting means 105), call duration comparing unit 147, and additional message processing unit 149.

Antenna 121 performs transmit/receive processing of radio signals. Transceiver 123 and baseband processing unit 125 perform modulation/demodulation processing for inputted and outputted radio signals. Control unit 127 is a circuit for controlling the operation of the portable communication terminal on the basis of a control program previously stored in memory 141.

Battery 129 serves as a power supply for the portable communication terminal. Receiver 131 serves as a speech receiving unit. Microphone 133 serves as a speech transmitting unit. Display unit 135 displays the present time, telephone numbers, messages, or the like. User interface unit 137 recognizes inputs through manipulation button 139 comprising a plurality of buttons and transmit the inputs to control unit 127.

Memory 141 stores a plurality of telephone numbers registered by a user of the portable communication terminal, numerals and characters used in transmitting or receiving an additional message, present settings of respective functions, reception histories, or the like.

Voice record/playback unit 143 records a voice message from a transmitting side when an answering machine function operates. A voice message from a transmitting side is received at antenna 121.

The received voice message is subjected to demodulation processing with transceiver 123 and baseband processing unit 125, and stored in voice record/playback unit 143 with control unit 127.

A voice message of a user inputted from microphone 133 is also stored in voce record/playback unit 143 with control unit 127. The voice message stored in voice record/playback unit 143 is arbitrarily read with external manipulation through manipulation button 139 and played back from-receiver 131.

Voice record/playback unit 143 previously stores voice data for generating a reply message. The voice data for generating a reply message is read from voice record/playback unit 143 with control unit 127 and transmitted to a calling party when no reply is made in a certain time at call reception. The calling party is notified that the called party can not answer the call and the calling party records the business by voice.

Timer 145 counts a call duration. The call duration is counted regardless of transmission or reception. Timer 145 starts a counting operation after a telephone line is established with a called party. The counting operation is started, for example, in response to a call start notification (not shown) generated from control unit 127 at transmission or reception.

Timer 145 stops the counting operation in response to pressing of disconnect key switch (not shown) and determines the call duration. The disconnect key switch is provided in manipulation button 139 for hanging up. Timer 145 transfers the counted call duration to call duration comparing unit 147.

Call duration comparing unit 147 holds a preset call duration. Call duration comparing unit 147 compares the counted call duration from timer 145 with the preset call duration.

The preset call duration is set to be less than 5 seconds if the time from establishment of a communication channel with a called party to finding of a misdial is set to be less than 5 seconds, or set to be less than 10 seconds if the time is set to be less than 10 seconds.

The preset call duration is arbitrarily set or can be set by a user of the portable communication terminal. A waiting time in this setting operation is approximately several milliseconds or shorter.

Call duration comparing unit 147 transfers the comparison result to additional message processing unit 149. Additional message processing unit 149 stores table 115. Table 115 is an apology message for unspecified person and a telephone directory as shown in FIG. 4, in which called parties, telephone numbers of the called parties, and recognition codes corresponding to additional messages are registered.

An additional message (postscript message) is a voice message preset for each called party, or a message consisting of a voice message and display message. The additional message is transmitted to a called party on the basis of a counted call duration. The display message is displayed in a display unit of a called party.

Additional message processing unit 149 holds a recognition code set for a called party simultaneously with the start of a call. Additionally, additional message processing unit 149 outputs the held recognition code to control unit 127 in response to the comparison notification from call duration comparing unit 147.

Control unit 127 (control means 109) refers to table 115 stored in additional message processing unit 149 in response to the outputted recognition code.

Control unit 127 reads an additional message corresponding to the outputted recognition code and transmits it to the called party. The read additional message is transmitted to the called party with transmit/receive means 103 shown in FIG. 1, and the telephone line with the called party is disconnected immediately afterward.

While call duration comparing unit 147 is discriminated from additional message processing unit 149 for convenience in the present embodiment, the two units may form one component as selecting means 107 shown in FIG. 1.

FIG. 3 shows an example of table 115 in which apology messages are registered. Table 115 has various voice apology messages registered therein, in which a voice message (No.3) recorded with a voice memo, and a voice message (No. 5) for answering machine record guidance are registered.

Apology messages (messages, No. 1 and No. 2) are also registered in table 115. Apology dditional messages are set corresponding to recognition codes, thereby allowing a plurality of apology messages to be distinctively registered.

In the present embodiment, at least one pair of an apology message and a recognition code corresponding to the additional message is registered in table 115. One of the registered pairs is preset.

For example, in FIG. 3, when a pair of a recognition code A and an additional message corresponding to the recognition code A is set in table 115 (mark O), the recognition code A is automatically set also in additional message processing unit 149. In FIG. 4, table 115 is a telephone directory as shown in which called parties, telephone numbers of the called parties, and recognition codes corresponding to additional messages are registered.

Figure 5:
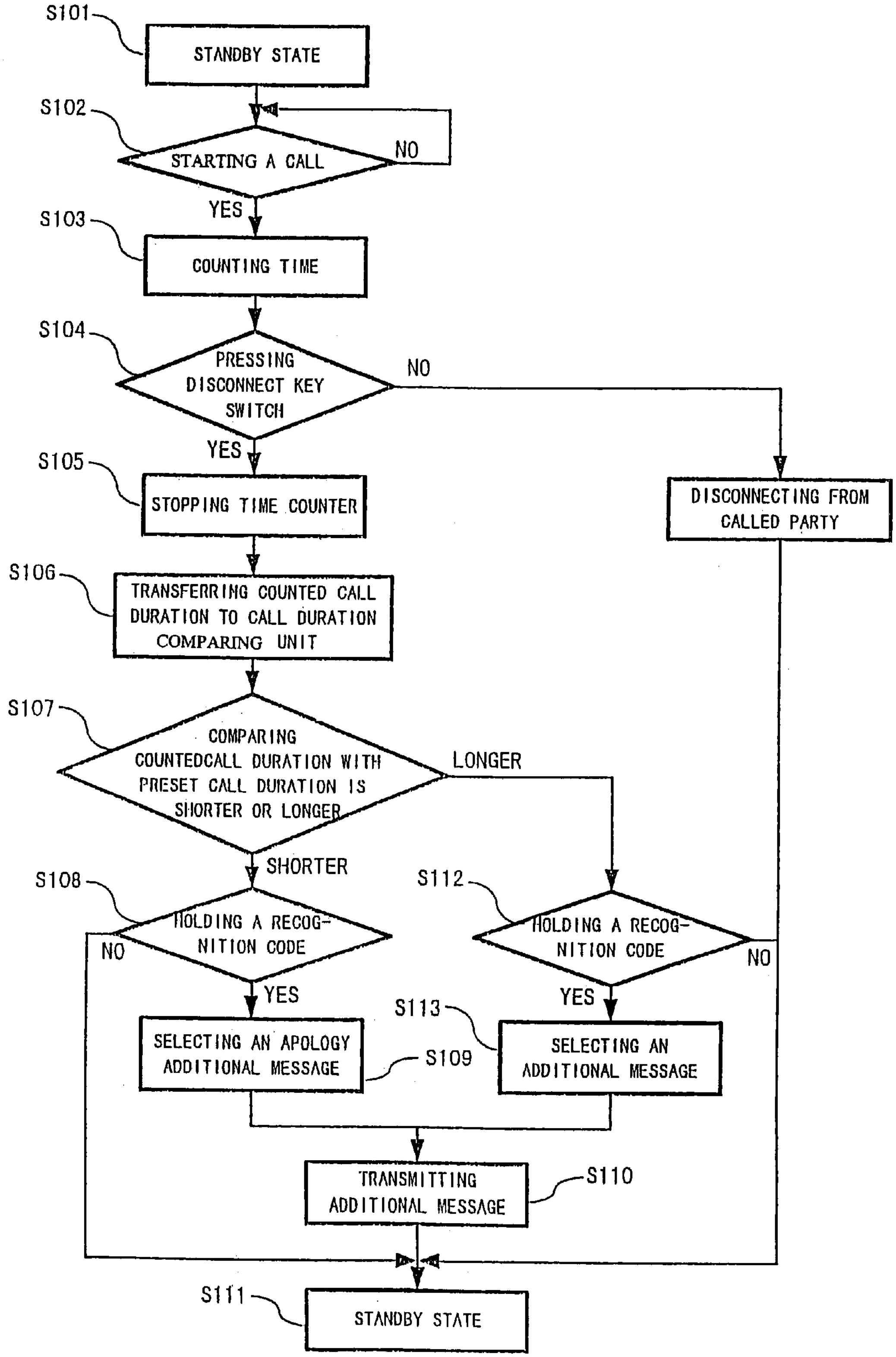
FIG. 5 is a flow chart for explaining an operation of the portable communication terminal.

Next, the operation of the portable communication terminal of the present invention will be described in conjunction with the correspondence between the functional block diagram shown in FIG. 1 and the configurational block diagram shown in FIG. 2. FIG. 5 shows a flow chart for explaining the operation of the portable communication terminal of the present invention.

First, processing with transmit/receiver means 103 is performed. At standby (S101), connection is established with a called party by baseband processing unit 125, transceiver 123 and antenna 121, and a call is started (Yes at S102).

Next, processing with counting means 105 is performed. After the establishment of telephone line with the called party at S102, timer 145 start a counting operation on the basis of an instruction from control unit 127 (S103). If the telephone line is not established with the called party at S102, the portable communication terminal returns to a standby state.

Next, processing with manipulation means 113 is performed. If a user of a PHS terminal presses the disconnect key switch of manipulation button 139 through external input manipulation (S104). Timer 145 stops the counting operation in response to an instruction from control unit 127 (S105).

Timer 145 transfers the counted call duration to call duration comparing unit 147 (S106). At this point, the communication channel is established with the called party, and the determination whether an additional message is present or not is waited.

Next, processing with selecting means 107 is performed call duration comparing unit 147 first compares the counted call duration with the preset call duration (S107). When the counted call duration is shorter the preset call duration, call duration comparing unit 147 transfers the fact as a comparison result to additional message processing unit 149.

Next, additional message processing unit 149 transfers a previously held recognition code to control unit 127 on the basis of the comparison result from call duration comparing unit 147 (S108).

Next, processing with control means 109 is performed. Control unit 127 refers to table 115 stored in additional message processing unit 149 in response to the recognition code outputted from additional message processing unit 149 (S109).

Additionally, control unit 127 reads an additional message (apology message) corresponding to the recognition code from the table. The read apology message is subjected to transmission processing for transmission (S110).

Control unit 127 disconnects the telephone line with the called party immediately after the additional message is transmitted to cause the portable communication terminal to enter a standby state (S111). At S104, if the telephone line is disconnected by the called party prior to external input manipulation, the additional message is not transmitted and the portable communication terminal returns to a standby state. If no recognition code is present (S108), the portable communication terminal also returns to a standby state (S111).

On the other hand, when the counted call duration is longer the preset call duration, call duration comparing unit 147 transfers the fact as a comparison result to additional message processing unit 149 (S107).

Next, additional message processing unit 149 transfers a previously held recognition code to control unit 127 on the basis of the comparison result from call duration comparing unit 147 (S112).

Next, processing with control means 109 is performed. Control unit 127 refers to table 115 stored in additional message processing unit 149 in response to the recognition code outputted from additional message processing unit 149 (S113).

Additionally, control unit 127 reads an additional message corresponding to the recognition code from the table. The read additional message is subjected to transmission processing for transmission (S110).

Control unit 127 disconnects the telephone line with the called party immediately after the additional message is transmitted to cause the portable communication terminal to enter a standby state (S111). If no recognition code is present (S112), the portable communication terminal also returns to a standby state (S111).

Figure 6:
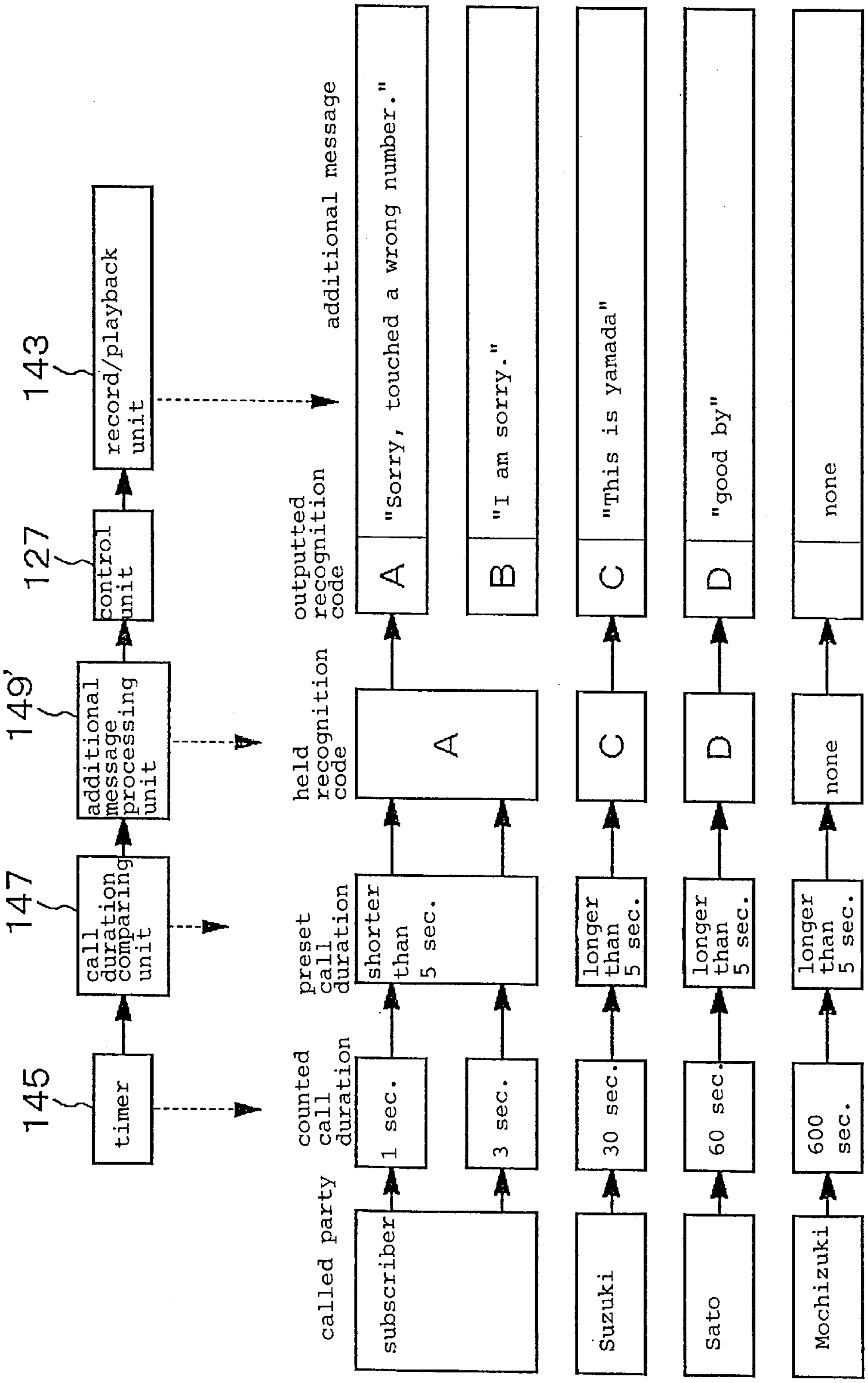
FIG. 6 is a schematic diagram for explaining an operation of transmitting an additional message in a portable communication terminal.

FIG. 6 shows an example of processing of transmitting an additional message with the portable communication terminal of the present embodiment. In FIG. 6, a call duration preset in call duration comparing unit 147 is set to be "5 seconds or longer".

Referring to FIG. 6, when a called party is Mr. Suzuki, for example, a user of the portable communication terminal makes a call on the basis of table 115 (telephone directory), and hangs up using a disconnect key switch through external input manipulation after conversation for 30 seconds.

Timer 145 transfers a counted call duration (30 seconds) to call duration comparing unit 147. Call duration comparing unit 147 determines that the counted call duration (30 seconds) exceeds a preset call duration (5 seconds) to transfer a comparison notification indicating "5 seconds or longer" to additional message processing unit 149.

Additional message processing unit 149 holds a recognition code C corresponding to Mr. Suzuki on the basis of table 115 at the start of the call. Additional message processing unit 149 outputs the held recognition code C to control unit 127 in response to the comparison notification indicating "5 seconds or longer" from call duration comparing unit 147.

Control unit 127 refers to table 115 stored in additional message processing unit 149 in response to the selected recognition code C from additional message processing unit 149.

Additionally, control unit 127 reads an additional message "This is Yamada." corresponding to the selected recognition code C. The read additional message is transmitted to the called party, and the telephone line is disconnected immediately afterward.

When a call duration with Mr. Suzuki is 60 seconds, or 600 seconds, similar operations are performed since the preset call duration is 5 seconds or longer.

In the case of Mr. Sato, for example, a recognition code D is held in additional message processing unit 149. On the basis of a comparison between a counted call duration (60 seconds) and the preset call duration (5 seconds or longer), an additional message "Good-by!" is transmitted. The telephone line is disconnected immediately after the additional message is transmitted.

Furthermore, in the case of Mr. Mochizuki, no recognition code is selected in additional message processing unit 149. Call duration comparing unit 147 compares a counted call duration (600 seconds) with the preset call duration (5 seconds or longer) to transfer a a comparison notification indicating "5 seconds or longer" to additional message processing unit 149.

Since additional message processing unit 149 does not hold a recognition code, control unit 127 does not transmit an additional message and the telephone line is disconnected.

Figure 7:
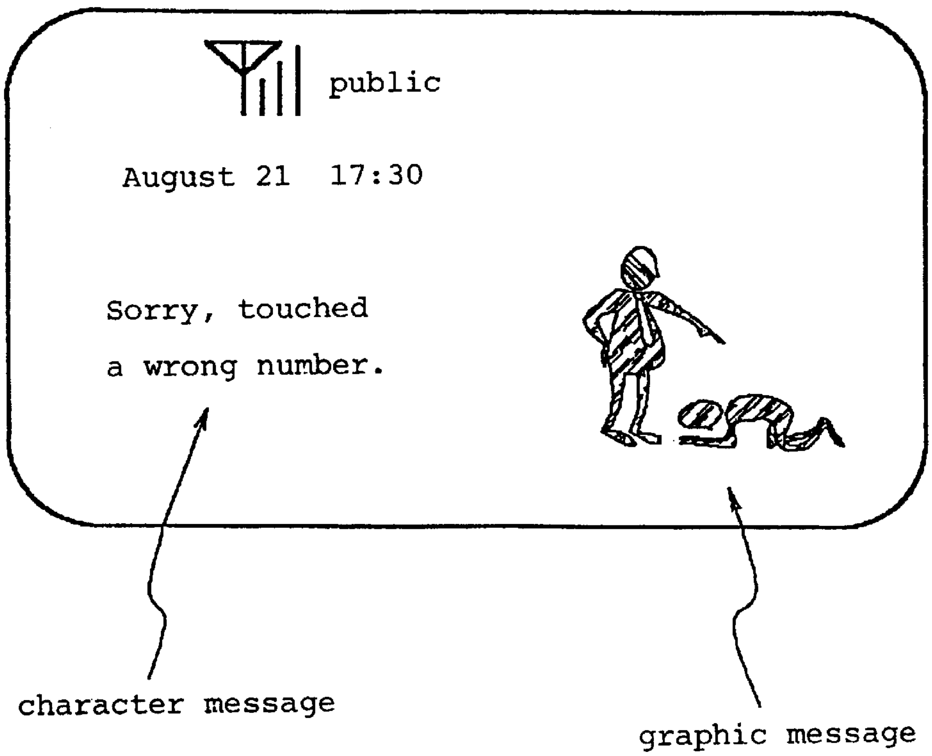
FIG. 7 is a diagram for explaining a display example of an apology message in the table of the present invention.

FIG. 7 shows an example of a display message displayed in a display unit of a called party. In FIG. 7, a character message and graphic message are shown as the display message. The display example in FIG. 7 shows "Sorry, touched a wrong number." with the character message, and shows an apologetic situation with the graphic message.

Figure 8:
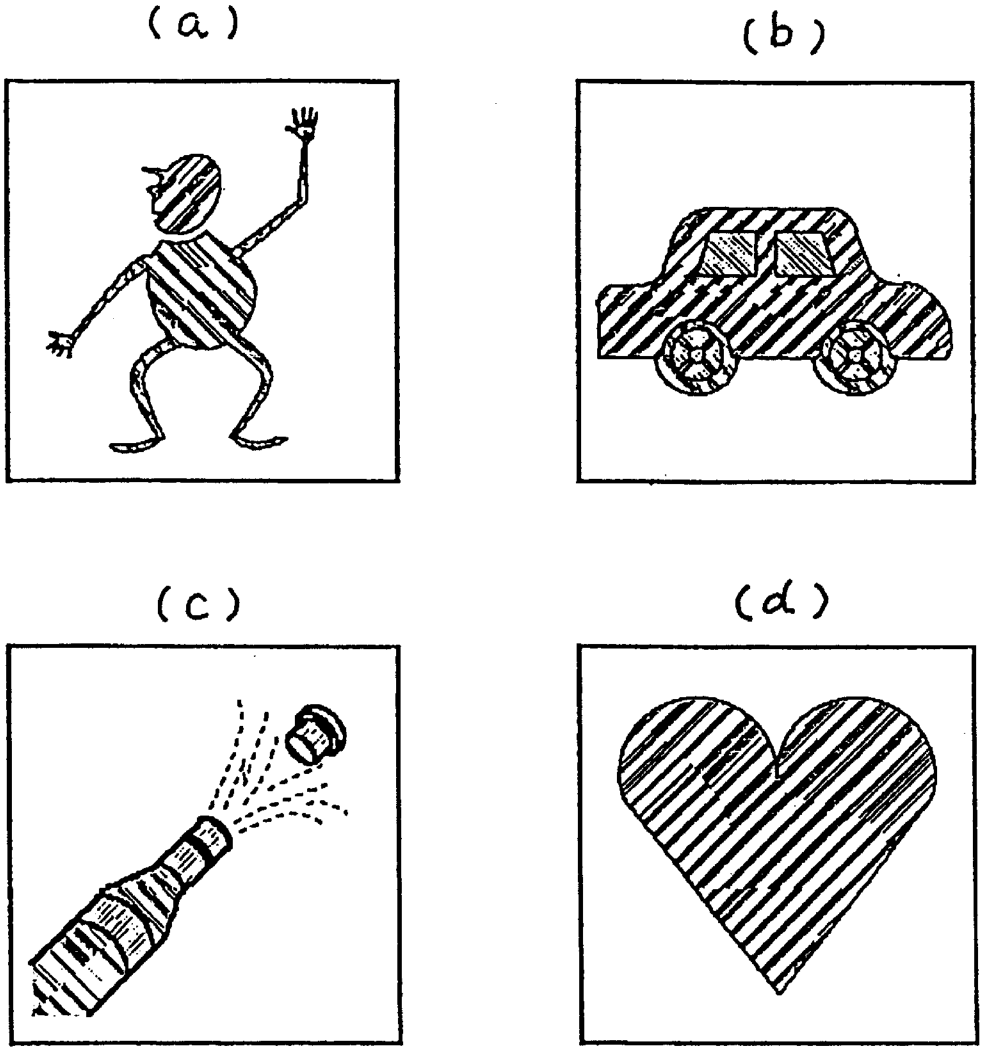
FIG. 8 is a diagram for explaining variations of a display example of an additional message in the table of the present invention.

FIG. 8 shows an example of combinations of graphic messages and character messages in many variations. FIG. 8(*a*) shows "Good Bye. I will call you soon.", FIG. 8(*b*) "Let's take a drive", FIG. 8(*c*) "Happy Birthday", FIG. 8(*d*) "Good Bye", or the like. The settings of additional messages shown in FIG. 8 can be registered through external manipulation.

In the present embodiment, when a called party is an unspecified person (see FIG. 4), additional message processing unit 149 holds a recognition code A corresponding to unspecified persons on the basis of table 115 at the start of a call.

Additional message processing unit 149 outputs the recognition code A to control unit 127 in response to a comparison notification indicating the call duration is not "5 seconds or longer" from call duration comparing unit 147. Control unit 127 refers to table 115 stored in additional message processing unit 149 in response to the outputted recognition code A.

Control unit 127 reads an additional message "Sorry, touched a wrong number." corresponding to the outputted recognition code A. The read additional message is transmitted to the called party, and the telephone line is disconnected immediately afterward.

The portable communication terminal according to the present embodiment allows an additional message to be preset for a called party and a short message to be easily transmitted before the telephone line is disconnected.

What is claimed is:

1. A portable communication terminal comprising:

transmit/receive means including an antenna;

time counting means for counting a call duration on the basis of a state of connection with a called party, said counted call duration to be compared to a preset call duration;

a table in which correspondence between a recognition code corresponding to at least one additional message to be transmitted and said called party is previously registered;

selecting means for previously holding said recognition code corresponding to said additional message to be transmitted to said called party and outputting said held recognition code on the basis of said counted call duration; and control means for reading said additional message on the basis of said outputted recognition code, and said additional message being one of a (a) text message for said called party, said text message displayed with a corresponding graphical display message, and (b) a graphical display message which excludes its corresponding text message, said additional message transmitted to said called party when said counted call duration is longer than said preset call duration.

2. The portable communication terminal according to claim 1, further comprising manipulation means, wherein the end of a call in said call duration is determined in response to manipulation with said manipulation means, and said state of connection with said called party is disconnected after said additional message is transmitted.

3. The portable communication terminal according to claim 1, wherein said selecting means includes:

means for storing a preset call duration;

means for comparing said counted call duration with said preset call duration;

means for previously holding said recognition code corresponding to said additional message to be transmitted to said called party; and means for outputting said held recognition code on the basis of the result of said comparison.

4. A method of transmitting a message in a portable communication terminal, said method comprising the steps of:

counting a call duration on the basis of a state of connection with a called party;

registering at least one additional message in correspondence with a recognition code on a table;

registering correspondence between said recognition code corresponding to at least one additional message to be transmitted and said called party on said table;

holding said recognition code corresponding to an additional message to be transmitted;

outputting said held recognition code on the basis of said counted call duration;

reading said additional message on the basis of said outputted recognition code, said step of outputting said recognition code comprising the steps of:

storing a preset call duration;

comparing said counted call duration with said preset call duration;

previously holding said recognition code corresponding to said additional message to be transmitted to said called party; and selecting said held recognition code on the basis of the result of said comparison, and said step of selecting said held recognition code comprises the steps of:

transmitting a preset voice message and a display message to said called party when said counted call duration is shorter than said preset call duration; and transmitting a preset voice message for each said called party and a display message to said called party when said counted call duration is longer than said preset call duration, said display message including one of a (a) graphical message and (b) a graphical message displayed with a text message, said graphical message corresponding to said text message.

5. The A method of transmitting a message in a in a portable communication terminal according to claim 4, further composing the steps of:

determining the end of a call in said call duration; and disconnecting said state of connection with said called party after said additional message is transmitted.

* * * * *